US012718392B2

(12) United States Patent
Sam et al.

(10) Patent No.: US 12,718,392 B2
(45) Date of Patent: Aug. 25, 2026

(54) REFINING DATA MAPS

(71) Applicant: QUALCOMM Incorporated, San Diego, CA (US)

(72) Inventors: Mathew Sam, San Diego, CA (US); Khalid Tahboub, San Diego, CA (US); Mayukh Roy, Hyderabad (IN); Bing Han, San Diego, CA (US); Kai Wang, San Diego, CA (US); Ashish Medewar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/435,771

(22) Filed: Feb. 7, 2024

(65) Prior Publication Data

US 2025/0252588 A1 Aug. 7, 2025

(51) Int. Cl.
*G06K 9/00* (2022.01)
*G06T 7/593* (2017.01)

(52) U.S. Cl.
CPC .... *G06T 7/593* (2017.01); *G06T 2207/10012* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 11,816,855 B2 | 11/2023 | Luo et al. | |
| 2018/0300894 A1 | 10/2018 | Toksvig et al. | |
| 2019/0304164 A1 | 10/2019 | Zhang | |
| 2021/0241479 A1* | 8/2021 | Jie | G06N 3/0464 |
| 2021/0248769 A1* | 8/2021 | Luo | G06T 7/593 |
| 2023/0037731 A1 | 2/2023 | Guizilini et al. | |
| 2024/0404093 A1* | 12/2024 | Jeong | G06T 7/593 |
| 2025/0238946 A1* | 7/2025 | Tjersland | G06T 3/40 |

FOREIGN PATENT DOCUMENTS

WO 2020198119 A1 10/2020

OTHER PUBLICATIONS

International Search Report and Written Opinion—PCT/US2025/013458—ISA/EPO—May. 13, 2025.

* cited by examiner

*Primary Examiner* — SJ Park
(74) *Attorney, Agent, or Firm* — QUALCOMM Incorporated; Espartaco Diaz Hidalgo

(57) ABSTRACT

Systems and techniques are described herein for modifying a map. For instance, a method for modifying a map is provided. The method may include processing a first data map and a reference image to generate first features, the first data map including a first number of data values; processing a guide image to generate second features; modifying the first features based on the second features to generate modified features; modifying the first data map based on the modified features to generate a modified first data map; and generating a second data map based on the modified first data map, the second data map including a second number of data values that is greater than the first number of data values.

20 Claims, 10 Drawing Sheets

REFINING DATA MAPS

TECHNICAL FIELD

The present disclosure generally relates to depth estimation. For example, aspects of the present disclosure relate to systems and techniques for refining data maps, such as disparity maps and/or depth maps.

BACKGROUND

Many devices can capture a representation of a scene by generating images (e.g., image frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for modifying a map. According to at least one example, a method is provided for modifying a map. The includes: processing a first data map and a reference image to generate first features, the first data map including a first number of data values;

processing a guide image to generate second features; modifying the first features based on the second features to generate modified features; modifying the first data map based on the modified features to generate a modified first data map; and generating a second data map based on the modified first data map, the second data map including a second number of data values that is greater than the first number of data values.

In another example, an apparatus for modifying a map is provided that includes at least one memory and at least one processor (e.g., configured in circuitry) coupled to the at least one memory. The at least one processor configured to: process a first data map and a reference image to generate first features, the first data map including a first number of data values; process a guide image to generate second features; modify the first features based on the second features to generate modified features; modify the first data map based on the modified features to generate a modified first data map; and generate a second data map based on the modified first data map, the second data map including a second number of data values that is greater than the first number of data values.

In another example, a non-transitory computer-readable medium is provided that has stored thereon instructions that, when executed by one or more processors, cause the one or more processors to: process a first data map and a reference image to generate first features, the first data map including a first number of data values; process a guide image to generate second features; modify the first features based on the second features to generate modified features; modify the first data map based on the modified features to generate a modified first data map; and generate a second data map based on the modified first data map, the second data map including a second number of data values that is greater than the first number of data values.

In another example, an apparatus for modifying a map is provided. The apparatus includes: means for processing a first data map and a reference image to generate first features, the first data map including a first number of data values; means for processing a guide image to generate second features; means for modifying the first features based on the second features to generate modified features; means for modifying the first data map based on the modified features to generate a modified first data map; and means for generating a second data map based on the modified first data map, the second data map including a second number of data values that is greater than the first number of data values.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
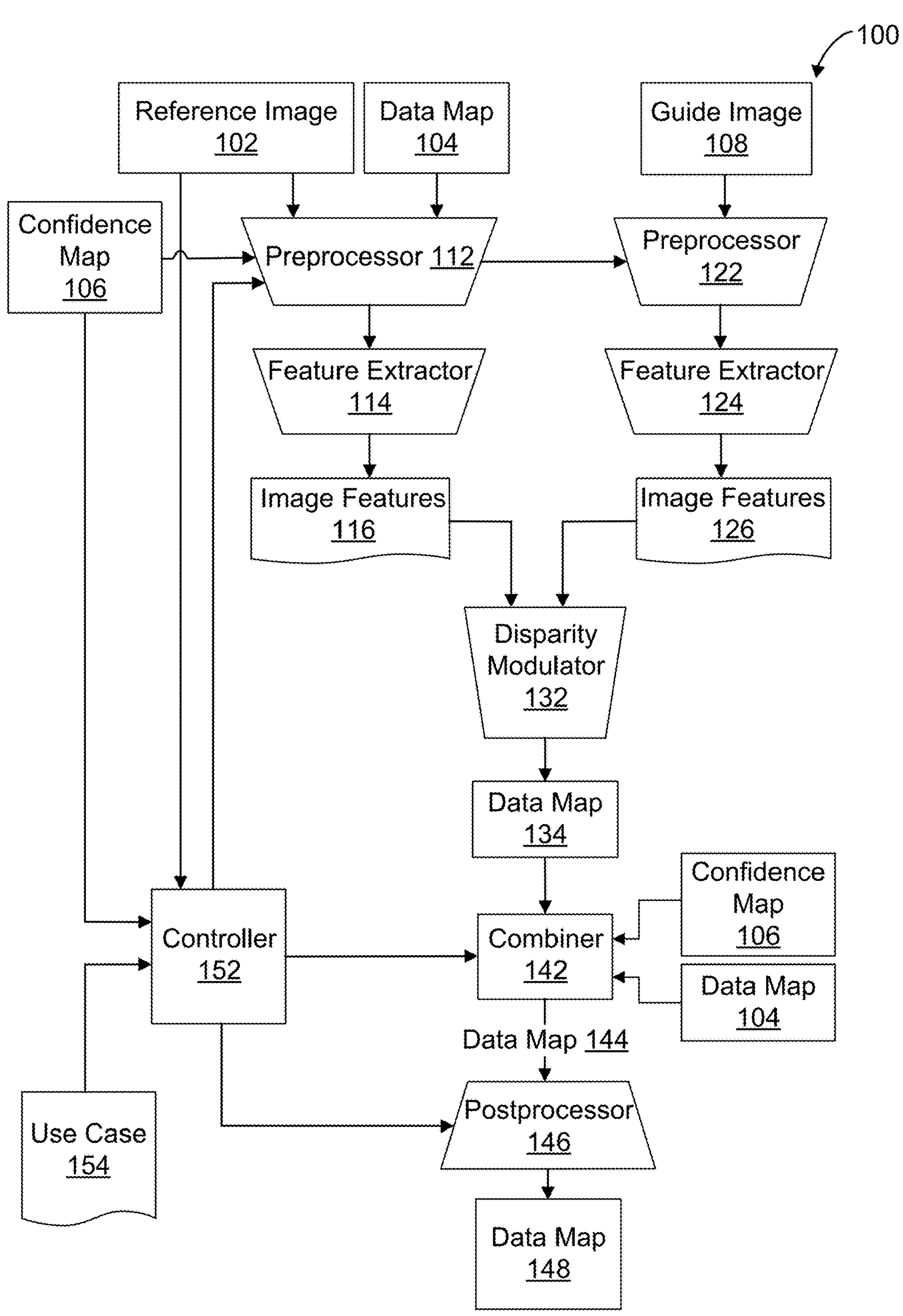
FIG. 1 is a diagram illustrating a system for refining disparity and/or depth maps, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As noted above, machine learning systems (e.g., deep neural network systems or models) can be used to perform a variety of tasks such as, for example, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. Moreover, machine learning models can be versatile and can achieve high quality results in a variety of tasks.

In some cases, a machine learning system can perform depth estimation based on a single image (e.g., based on receiving a single image as input). Depth estimation based on a single input image can be referred to as monocular depth estimation. Depth estimation based on a pair of stereoscopic images (e.g., corresponding to two slightly different views of the same scene) can be referred to as stereo depth estimation and/or depth-from-stereo (DFS).

Depth estimation can be used for many applications (e.g., extended reality (XR) applications, vehicle applications, image-modification applications, such as artificial green-screen applications and/or synthetic bokeh applications, etc.). In some cases, depth estimation can be used to perform occlusion rendering, for example based on using depth and/or object segmentation information to render virtual objects in a 3D environment. In some cases, depth estimation can be used to perform 3D reconstruction, for example based on using depth information and one or more poses to create a mesh of a scene. In some cases, depth estimation can be used to perform collision avoidance, for example based on using depth information to estimate distance(s) to one or more objects.

Depth estimation can be used to generate three-dimensional content (e.g., such as XR content) with greater accuracy. For instance, depth estimation can be used to generate XR content that combines a baseline image or video with one or more augmented overlays of rendered 3D objects. The baseline image data (e.g., an image or a frame of video) that is augmented or overlaid by an XR system (e.g., a virtual reality (VR) system, augmented reality (AR) system, and/or mixed reality (MR) system) may be a two-dimensional (2D) representation of a 3D scene. A naïve approach to generating XR content may be to overlay a rendered object onto the baseline image data, without compensating for 3D depth information that may be represented in the 2D baseline image data.

Depth and/or disparity information can be obtained from one or more depth sensors which can include, but are not limited to, Time of Flight (ToF) sensors, light-based or range-based sensors, etc. Depth and/or disparity information can additionally, or alternatively, be obtained as a prediction or estimation that is generated based on one or more image inputs, depth inputs, etc. Accurate depth and/or disparity information can be used for various applications or systems. For instance, depth and/or disparity information can be used for vehicles to perceive a driving scene and surrounding environment, and to estimate the distances between the vehicle and surrounding environmental objects (e.g., other vehicles, pedestrians, roadway elements, etc.). Accurate depth and/or disparity information may be needed for the vehicle to determine and perform appropriate control actions, such as velocity control, steering control, braking control, etc.

In another example, depth and/or disparity information can be used for extended reality (XR) applications for functions such as indoor scene reconstruction and obstacle detection for users, among various others. For instance, accurate depth information can be needed for improved integration of real scenes with virtual scenes and/or to allow users to smoothly and safely interact with both their real-world surroundings and the XR or VR environment.

Depth information can also be used in robotics to perform functions such as navigation, localization, and interaction with physical objects in the robot's surrounding environment, among various other functions. For example, accurate depth information can be needed to provide improved navigation, localization, and interaction between robots and their surrounding environment (e.g., to avoid colliding with obstacles, nearby humans, etc.).

In another example, depth information can be used for image enhancement and/or other image manipulation applications or functions. For instance, depth information can be used to differentiate foreground and background portions of an image, which can subsequently be processed, manipulated, enhanced, etc., separately. In one illustrative example, depth information can be used to generate a bokeh effect that simulates an image taken with a low aperture value (e.g., a large physical aperture size), where the foreground of the image is sharply in focus while the background of the image is blurred (e.g., out of focus). Additionally or alternatively, depth information can be used for artificial-green-screen effects in which a background of a scene is replaced by another image.

Disparity estimation is a type of depth estimation that can be performed based on two (or more) images that depict the same scene from slightly different viewpoints. For instance, disparity estimation can be performed for pairs of stereo images (e.g., a left-right stereo image pair, an upper-lower stereo image pair, etc.). Stereo image pairs can be obtained using a stereo camera (e.g., a single camera device that includes two imaging sensors or sub-systems located in different positions). Stereo image pairs can, additionally or alternatively, be obtained using multiple different camera devices (e.g., a first camera device is used to capture a first image of the stereo pair, and a separate, second camera device is used to capture the second image of the stereo pair). In some examples, stereo image pairs can be obtained using a single camera device, where the first and second images of the stereo pair are captured at different moments in time and using different viewpoints of the scene.

As used herein, the term "stereo image pair," "stereo pair," "stereoscopically-paired images," and like terms may refer to a first image (e.g., corresponding to a first view of a scene) and a second image (e.g., corresponding to a second view of the scene, the second view different from the first view). The first and second images of a stereo image pair are also referred to herein as the "left" image and the "right" image, respectively. The left image of a stereo image pair can be associated with a "left camera," which may refer to an image sensor or other imaging system used to obtain the left image. The right image of a stereo image pair can be associated with a "right camera," which may refer to an image sensor or other imaging system used to obtain the left image. As used herein, the terms "left camera" and "right camera" may refer to separate camera devices and/or may refer to a stereo camera device (or other single camera device that includes two image sensors or imaging sub-systems). The left and right cameras may have any relative position and need not be left and right of one another.

Disparity estimation can be performed to determine or otherwise estimate disparity information corresponding to a stereo image pair. Given a point or location of a scene that is depicted in both images of a stereo image pair, the disparity can be determined as the difference between the corresponding pixel location in the left and right images of the stereo image pair. In various aspects, disparity can be the difference in image location (e.g., pixel location) of the same 3D point when projected under perspective to the left and right cameras associated with capturing a stereo image pair. For instance, any point in the scene that is visible in both cameras will be projected to a pair of image points in the two images (e.g., referred to as a conjugate pair). The displacement between the pixel positions of the two points is the disparity.

Data maps can be used to convey information, such as depth and/or disparity information. For example, a depth map can include values indicating depth of a scene. In another example, a disparity map can include values indicating disparity values associated with a scene. For instance, disparity estimation can be used to generate a disparity map corresponding to a stereo image pair. The disparity map can have the same pixel resolution as the stereo image pair and can include a calculated disparity value for each pixel location of the plurality of pixels included in the resolution. The disparity map can be indicative of the disparity between an anchor image (e.g., either the left or right image of the stereo pair, selected and used as a baseline for generating the disparity map) and a non-anchor image (e.g., the remaining one of either the left or right image of the stereo pair). The magnitude or absolute value of the disparity may be the same in the disparity map generated using the left image of a stereo pair as the anchor (e.g., a left-to-right disparity map) as it is in the disparity map generated using the right image of the stereo pair as the anchor (e.g., a right-to-left disparity map). The directionality or sign of the disparities in the left-to-right disparity map may be the opposite of those in the right-to-left disparity map.

A disparity map generated for a stereo image pair can be used to generate depth information of the scene depicted in the stereo image pair. For example, depth information (e.g., a depth estimate) can be determined using the disparity map and camera intrinsic information corresponding to the left and right cameras used to capture the left and right images (respectively), of the stereo image pair. Camera intrinsic information can include the distance between the image sensor or imaging plane of the left camera and the image sensor or imaging plane of the right camera (e.g., the baseline distance between the left and right cameras). The camera intrinsic information can additionally include a focal length associated with the left camera/left image and a focal length associated with the right camera/right image. Given the baseline distance and respective focal lengths of the left and right cameras, a one-to-one mapping between disparity information and depth information can be calculated. For instance, a depth map can be generated based on calculating, for each pixel location of the disparity map, a corresponding depth value given by: depth=(baseline*focal length)/disparity.

Because of the relationship between disparity and depth, in some cases, references to disparity may apply to depth as well and references to depth may apply to disparity as well. For example, in some cases, the term "depth map" may refer to either a depth map or a disparity map and the term "disparity map" may refer to either a disparity map or a depth map.

In some examples, various feature-matching algorithms can be used to estimate the disparity between a pair of stereo images (e.g., feature-matching algorithms can be used to generate or estimate a disparity map corresponding to a stereo image pair). Feature-matching algorithms may implement local or global feature matching. For example, local feature matching can be implemented to naively look for matches across local patches based on a robust function. Global feature matching can be implemented using relatively more complex optimization techniques and may also be referred to as optimization-based feature-matching algorithms.

Disparity maps generated using feature-matching algorithms are often imperfect estimates and include errors and/or other inaccuracies. For example, disparity maps generated using feature matching can be affected by artifacts that correspond to feature matching errors near occlusions, thin structures (e.g., thin in a dimension parallel to the baseline between the cameras), reflective surfaces, etc., that are depicted in the stereo image pair. Estimated disparity maps generated using feature matching can additionally, or alternatively, have missing regions (e.g., corresponding to a lack of salient visual features, failed feature matching, etc.). There is a need for improved disparity estimation that can be used to generate more accurate disparity map estimations and/or disparity map estimations with fewer artifacts and feature matching errors.

Additionally or alternatively, depth information (e.g., obtained from one or more depth sensors such as Time of Flight (ToF) sensors and/or light-based or range-based sensors) may include inaccurate depth values and/or omit depth values. For example, a depth sensor may determine confidence values corresponding to depth values. The confidence values may indicate how confident the depth sensor (or a depth-determination system using the depth sensor) is in the depth values. For example, if a depth sensor measures different depth values from a point in a scene at two different times (e.g., a first time and a second time that is milliseconds after the first time), the depth sensor may report one of the depth values (or an average between the depth values) and a low confidence value corresponding to the depth value.

Additionally or alternatively, depth sensors may not determine depth values for some "pixels" of the depth sensor. For example, a depth sensor may be configured to generate a grid of twenty by ten depth values. Based on measurements of a scene, the depth sensor may not determine depth values from some positions in the grid. For example, measurements for a position in the grid may vary over time (e.g., depth values may vary by meters within milliseconds) and rather than determining a depth value with a low confidence, a depth sensor may omit a depth value for the position in the grid. Positions in a grid lacking depth values may be referred to as "holes." A depth map (e.g., a grid of depth values) including one or more holes may be referred to as "sparse."

Likewise, disparity maps may include holes and be sparse. For example, a feature-matching algorithm may be unable to uniquely match a point of a right image with a point in a left image. In such cases, a disparity-map generator may generate a sparse disparity map including a hole corresponding to the point in the right image.

In some examples, a disparity-estimation pipeline (and/or depth-estimation pipeline) can additionally include a refinement module that is used to refine the initial estimated disparity map (and/or depth map) generated using a feature-matching algorithm. Existing techniques for disparity-map refinement (and/or depth-map refinement) use machine learning networks (e.g., deep learning networks) to generate a refined disparity map (and/or refined depth map) based on an input comprising an estimated disparity map (e.g., an initial estimated disparity map generated based on feature matching) (and/or estimated depth map, e.g., based on depth measurements or calculated based on a disparity map).

Deep-learning-based disparity refinement (and/or deep-learning-based depth refinement) can be used to sequentially detect, replace, and/or refine noisy or omitted pixels in an input or initial disparity map (or initial depth map). However, deep-learning-based disparity refinement (and/or deep-learning-based depth refinement) does not always provide accurate refined results, and can generate refined disparity maps (and/or depth maps) with an accuracy that is approximately the same as (or even worse than) the accuracy of the initial disparity map estimation (and/or depth map) provided as input. There is a need for systems and techniques that can be used to generate more accurate disparity maps (and/or depth maps) and/or disparity estimations for stereo image pairs. There is a further need for systems and techniques that can be used to perform more accurate disparity (and/or depth) refinement.

Systems, apparatuses, processes (also referred to as methods), and computer-readable media (collectively referred to as "systems and techniques") are described herein for refining data maps, such as disparity maps and/or depth maps. As an example, the systems and techniques may obtain a data map (e.g., a disparity map and/or a depth map), a reference image (e.g., an image of a stereo image pair on which the data map is based), and a guide image. The systems and techniques may generate first image features based on the reference image and the data map. The systems and techniques may additionally generate second image features based on the guide image. In some aspects, the guide image may be related to the reference image. For example, the guide image may be a segmented instance of the reference image or a segmentation map indicative of segments of the reference image. In some aspects, the guide image may be an instance of the reference image.

The systems and techniques may refine the data map based on the first and second image features. For example, in some aspects, the systems and techniques may modify the first image features based on the second image features by processing the first image features and the second image features together (e.g., using a guided disparity-modulation machine-learning model) to generate modified image features. Then the systems and techniques may modify the data map based on the modified image features to generate a modified data map.

As another example, in some aspects, the systems and techniques may modify the data map based on the first and second image features, for example, by processing the first image features (based on the reference image and the disparity map) and the second image features (based on the guide image, such as using a guided disparity-modulation machine-learning model) to generate a modified data map.

Additionally or alternatively, the systems and techniques may determine whether to use confidence-based fusion to generate a refined data map (e.g., a refined disparity map and/or a refined depth map) corresponding to the stereo image pair. For example, the systems and techniques may determine whether to fuse the initially-obtained data map with the modified data map to generate a refined data map or not. The systems and techniques may determine whether to fuse the modified data map with the data map based on a quality of the data map and/or based on a use case for the refined data map. In some cases, the systems and techniques may determine to fuse the initially-obtained data map with the modified data map to generate a refined data map then output the refined data map. In other cases, the systems and techniques may determine to not fuse the initially-obtained data map with the modified data map and to output the initially-obtained data map.

For example, the systems and techniques may use confidence-based fusion to generate a refined data map (e.g., a refined disparity map and/or a refined depth map) corresponding to a pair of images (e.g., a stereo image pair). In some examples, the systems and techniques can generate the refined data map by fusing a first data map with a second data map, based on confidence information associated with the first data map. The first and second data map can correspond to the same pair of images (e.g., for example, the data map may be indicative of disparity information, or depth information, of the same stereo image pair). The first data map can be a first data map corresponding to a stereo image pair and the second data map can be a second data map corresponding to the stereo image pair. In some examples, the second data map can be a refinement of the first data map. For instance, the second data map can be an initial refined data map generated based on the first data map.

In some aspects, the first data map can be a depth-from-stereo (DFS) disparity map, or depth map. A DFS disparity map, or depth map, can be generated based on performing feature matching for the stereo image pair. The second data map can be generated based on the DFS data map. For example, the second data map can be generated based on using a machine-learning model to refine the DFS data map. In some aspects, the second data map can be generated using a deep learning (DL)-based refinement network (e.g., as described above). An output of the DL-based refinement network (e.g., the second data map) may also be referred to as an initial refined disparity map.

The systems and techniques can combine the DFS data map with the initial refined data map, based on confidence information (e.g., a confidence map) associated with the DFS data map. For example, the confidence-based fusion can be used to generate a final refined data map that includes a combination of disparity information, or depth information, of the DFS data map and disparity information, or depth information, of the initial refined data map. The combination (e.g., fusion) of the DFS and initial refined data maps can be performed based on each respective pixel location included in the data maps. For instance, the fused disparity output corresponding to each pixel location can be weighted using the corresponding confidence value (e.g., from the confidence map) for each pixel location.

The systems and techniques may determine whether to perform the confidence-based fusion or not based on a quality of the first and/or second data map and/or based on a use case for the data map. For example, the systems and techniques may determine whether to fuse the first and second data map based on the confidence map related to the first data map. Additionally or alternatively, the systems and techniques may determine whether to fuse the first and second data map based on how a final data map (e.g., an output of the systems and techniques) is likely to be used. For example, in some cases, for instance, when the final data map is intended to be used for image modification, sharpness of boundaries between foreground and background may be more important than the depth of the foreground and the depth of the background.

Various aspects of the application will be described with respect to the figures below.

FIG. 1 is a diagram illustrating a system 100 for refining disparity and/or depth maps, according to various aspects of the present disclosure. In general, system 100 may obtain a reference image 102, a guide image 108, a data map 104, and a confidence map 106. In some aspects, data map 104 may be based on reference image 102, for example, data map 104 may be determined using a depth from stereo (DFS) technique based on reference image 102 (and an image that forms a stereo pair with reference image 102). System 100 may generate data map 134 based on reference image 102, guide image 108, and data map 104. Data map 134 may be an improvement compared to data map 104. For example, data values (e.g., disparity values and/or depth values) of data map 134 may be more accurate than data values of data map 104. Additionally or alternatively, data map 134 may include more data values than data map 104. For example, data map 104 may be sparse, for example, data map 104 may include holes. Data map 134 may include data values in place of the holes. Thus, data map 134 may be more dense, or in other words, less sparse than data map 104.

Further, in some aspects, system 100 may combine data values (e.g., disparity values and/or depth values) of data map 134 with data values of data map 104. Controller 152 of system 100 may determine whether to combine data values of data map 134 with data values of data map 104. For example, based on confidence map 106 and/or use case 154, controller 152 may determine whether to combine data map 134 with data map 104.

Reference image 102 may be, or may include, an image of a scene. In some aspects, although reference image 102 is referred to in the singular form, reference image 102 may include a stereo pair of images of the scene.

Data map 104 may be, or may include, a disparity map and/or a depth map representative of the scene. In some aspects, data map 104 may be determined based on reference image 102. For example, data map 104 may be determined according to a depth-from-stereo (DFS) technique based on reference image 102 (and another image, not illustrated in FIG. 1, that forms a stereo image pair with reference image 102).

In some aspects, data map 104 may be determined according to depth measurements, for example, based on time of flight (TOF) sensor measurements and/or light-based or range-based sensor measurements. In such cases, reference image 102 a camera which captured reference image 102 may be positioned relative (e.g., close to) a sensor which captured measurements on which data map 104 is based such that reference image 102 and data map 104 both represent the scene.

Confidence map 106 may be, or may include, confidence values corresponding to data map 104. For example, confidence map 106 may include a confidence value for each data value (e.g., disparity values and/or depth value) of data map 104. A confidence value may indicate a confidence of the corresponding data value. The confidence may be determined by a technique that generated the data value. For example, a DFS technique may generate data values (e.g., disparity values and/or depth values) and may generate a confidence for each of the data values. For example, the confidence values of confidence map 106 may be determined based on the qualities of matches of features determined for the stereo image pair. Additionally or alternatively, confidence map 106 may be determined based on consistency checks across the left and right images of the stereo image pair. The confidence may be based on how confident the technique that generated data map 104 is in the data values of data map 104. Additionally or alternatively, the confidence may serve as an indication of how confident downstream consumers should be in the data values of data map 104. In some aspects, data map 104 may include confidence values, for example, data map 104 may include a separate channel indicative of confidence values of confidence map 106.

In some cases, system 100 can determine confidence map 106 using a confidence estimation engine (not illustrated in FIG. 1). The confidence estimation engine can generate confidence map 106 indicative of confidence information (e.g., a confidence value) for each pixel location of a plurality of pixel locations associated with reference image 102. In some cases, relatively low confidence values can correspond to estimates of relatively high error in data map 104. For example, in some examples, the confidence estimation engine may extract a plurality of respective features from first and second images of the stereo image pair including reference image 102. The confidence estimation engine can process the extracted features and the DFS disparity map estimation to determine potential issues, occluded regions, and/or various other pixel locations corresponding to relatively high error and low confidence. In some aspects, the confidence estimation engine can generate confidence map 106 based on left-right consistency information determined for the stereo image pair. The left-right consistency information can be determined based on analyzing a DFS disparity map generated using the left image as the reference frame (e.g., anchor) and a DFS disparity map generated using the right image as the reference frame (e.g., anchor).

Guide image 108 may be related to reference image 102. In some aspects, guide image 108 may be an instance of reference image 102. In some aspects, guide image 108 may be determined based on reference image 102. For example, guide image 108 may be a segmented instance of reference image 102. For example, reference image 102 may be provided to an image segmenter (e.g., a machine-learning model trained to segment images according to labels) and the image segmenter may generate guide image 108 based on reference image 102. Guide image 108 may be, or may include, a semantic segmentation map. A semantic segmentation map may not include some of the information of reference image 102. For example, a semantic segmentation map of reference image 102 may not include textures but may include shapes. By not including textures, guide image 108 may allow system 100 to focus and generate better results.

Preprocessor 112 of system 100 may process reference image 102 and data map 104 and provide the results to feature extractor 114. Preprocessor 112 may, among other things, modify the dimensions of reference image 102 and/or data map 104. For example, preprocessor 112 may scale reference image 102 and/or data map 104 according to the operation of system 100.

Feature extractor 114 of system 100 may generate image features 116 based on reference image 102 and data map 104 (e.g., as processed by preprocessor 112). Feature extractor 114 may be, or may include, a machine-learning model, such as a neural network (e.g., a convolution neural network (CNN)), trained to encode images and data maps as image features. Feature extractor 114 may be a residual network (e.g., a ResNet18).

Preprocessor 122 of system 100 may process guide image 108 and provide the results to feature extractor 124. Preprocessor 122 may, among other things, modify the dimensions of guide image 108. For example, preprocessor 122 may scale guide image 108 according to the operation of system 100 (e.g., to match dimensions of reference image 102).

Feature extractor 124 of system 100 may generate image features 126 based on guide image 108 (e.g., as processed by preprocessor 122). Feature extractor 124 may be, or may include, a machine-learning model, such as a neural network (e.g., a convolution neural network (CNN)), trained to encode images and data maps as image features.

Disparity modulator 132 of system 100 may generate data map 134 based on image features 116 and image features 126. For example, image features 126 may be used to modulate data map 104. For example, disparity modulator 132 may implement image-guided depth filtering. For instance, image features 126 (based on guide image 108) may be injected into data map 134 to introduce the structure seen in guide image 108 into data map 134. The deep-learning approach may cause the features learned from guide image 108 (e.g., image features 126) to be injected into the features learned from reference image 102 and depth map 104 (e.g., image features 116).

In some aspects, disparity modulator 132 may modify image features 116 based on image features 126 to generate modified image features (not illustrated in FIG. 1) then generate data map 134 based on the modified image features. In some aspects, disparity modulator 132 May generate data map 134 based on image features 116 and image features 126 directly. Disparity modulator 132 may be, or may include, one or more machine-learning models (e.g., deep neural networks) trained to generate a data map based on image features. An example implementation of disparity modulator 132 is provided with regard to FIG. 4.

Data map 134 may represent the same scene as is represented by data map 104. Data map 134 may be more dense than data map 104. For example, disparity modulator 132 may add data values to data map 104, for instance where data map 104 includes holes. Additionally or alternatively, data map 134 may be more accurate than data map 104.

Combiner 142 of system 100 may combine data values of data map 134 with data values of data map 104 based on confidence map 106 to generate data map 144. For example, combiner 142 may replace data values of data map 104 with data values of data map 134 based on confidence values of the data values. For example, combiner 142 may use confidence-based fusion to generate data map 144 corresponding to reference image 102. In some examples, combiner 142 may generate the data map 144 by fusing data map 104 with data map 134, based on confidence map 106. The combination (e.g., fusion) of data map 134 and data map 104 can be performed based on each respective pixel of data map 134 and data map 104. For instance, each depth value of data map 144 can be weighted using the corresponding confidence value (e.g., from confidence map 106) for each pixel location.

In some aspects, data map 144 may include a refined data value for each pixel location i determined as (confidencei*ATAi)+(1−confidencei)*predictedi. Here, confidencei represents the confidence information (e.g., confidence value from the confidence map) corresponding to pixel location i; DATAi represents the estimated disparity or depth information (e.g., a disparity value from a DFS disparity map, a depth value determined based on a disparity value, or a depth value measured using a depth sensor) corresponding to pixel location i; and predictedi represents the predicted data (e.g., a disparity value from the DL-based refined disparity map or a depth from the DL-based refined depth map) corresponding to pixel location i.

In some aspects, combiner 142 may generate data map 144 using more strongly weighted data values of data map 104 when the corresponding confidence of data map 104 (e.g., as indicated by the corresponding confidence value(s) of confidence map 106) are relatively high. When the corresponding confidence of the information of data map 104 is relatively low (e.g., as indicated by the corresponding confidence value(s) from confidence map 106), combiner 142 may more strongly weight the data values of data map 134.

For instance, confidence values may be numerical values indicative of a confidence percentage. In some cases, confidence values can be numerical values between 0 and 1. Data values from data map 104 can be weighted by the corresponding confidence value, where a greater confidence value (e.g., closer to a value of 1) corresponds to a greater weighting of the data value from the data map 104.

The data values from data map 134 can be weighted by the complement of the corresponding confidence value (e.g., the complement of a confidence value confidencei can be determined as 1−confidencei). A greater confidence value (e.g., closer to a value of 1) corresponds to a lesser weighting of the data value from data map 134, as a higher confidence value is associated with a lower complement value. A lower confidence value (e.g., closer to a value of 0) corresponds to a greater weighting of the data value from the data map 134, as a lower confidence value is associated with a higher complement value.

Controller 152 of system 100 may determine whether combiner 142 will combine data map 104 with data map 134 to generate data map 144 based on confidence map 106 and/or use case 154. For example, in some cases, for instance, when data map 148 (e.g., an output of system 100) is intended to be used for image modification (e.g., synthetic bokeh or artificial green screening), sharpness of boundaries between foreground and background may be more important than the depth of the foreground and the depth of the background. Accordingly, in such cases, controller 152 may determine whether to combine data map 104 and data map 134 such that data map 148 has the sharp boundaries.

Use case 154 is a representation of an indication of how data map 148 may be used (e.g., by a downstream consumer). Use case 154 may be indicative that data map 148 may be used, for example, for image modification (e.g., for synthetic bokeh or artificial green screening etc.), for extended reality (XR) applications (e.g., simultaneous location and mapping (SLAM) etc.), for navigation, for control of a robot, etc.

In some cases, controller 152 may determine whether to combine data map 104 with data map 134 (at combiner 142) on a pixel-by-pixel basis or region-by-region basis. For example, controller 152 may determine whether to combine some data values of data map 134 with data values of data map 104 based on confidence values corresponding to the data values and/or confidence values of a region of the data values. Additionally or alternatively, in some cases, controller 152 may determine whether to combine data map 104 with data map 134 as a whole.

In some cases, controller 152 may cause combiner 142 combine data map 104 and data map 134 such that map 144 includes data values from data map 104 and data values from data map 134. In other cases, controller 152 may cause combiner 142 to output data map 134 as data map 144. In still other cases, controller 152 may cause combiner 142 to output data map 104 as data map 144.

In any case, postprocessor 146 of system 100 may process data map 144 to generate data map 148. Postprocessor 146 may, among other things, modify the dimensions of data map 144. For example, postprocessor 146 may scale data map 144 according to an expected output size of data map 148. Depending on the quality and density of data map 104, controller 152 may decide to post process data map 144 entirely. Alternatively, controller 152 may determine to use data map 134 (as generated by disparity modulator 132) to update the incomplete estimates (holes) of data map 104.

Figure 2:
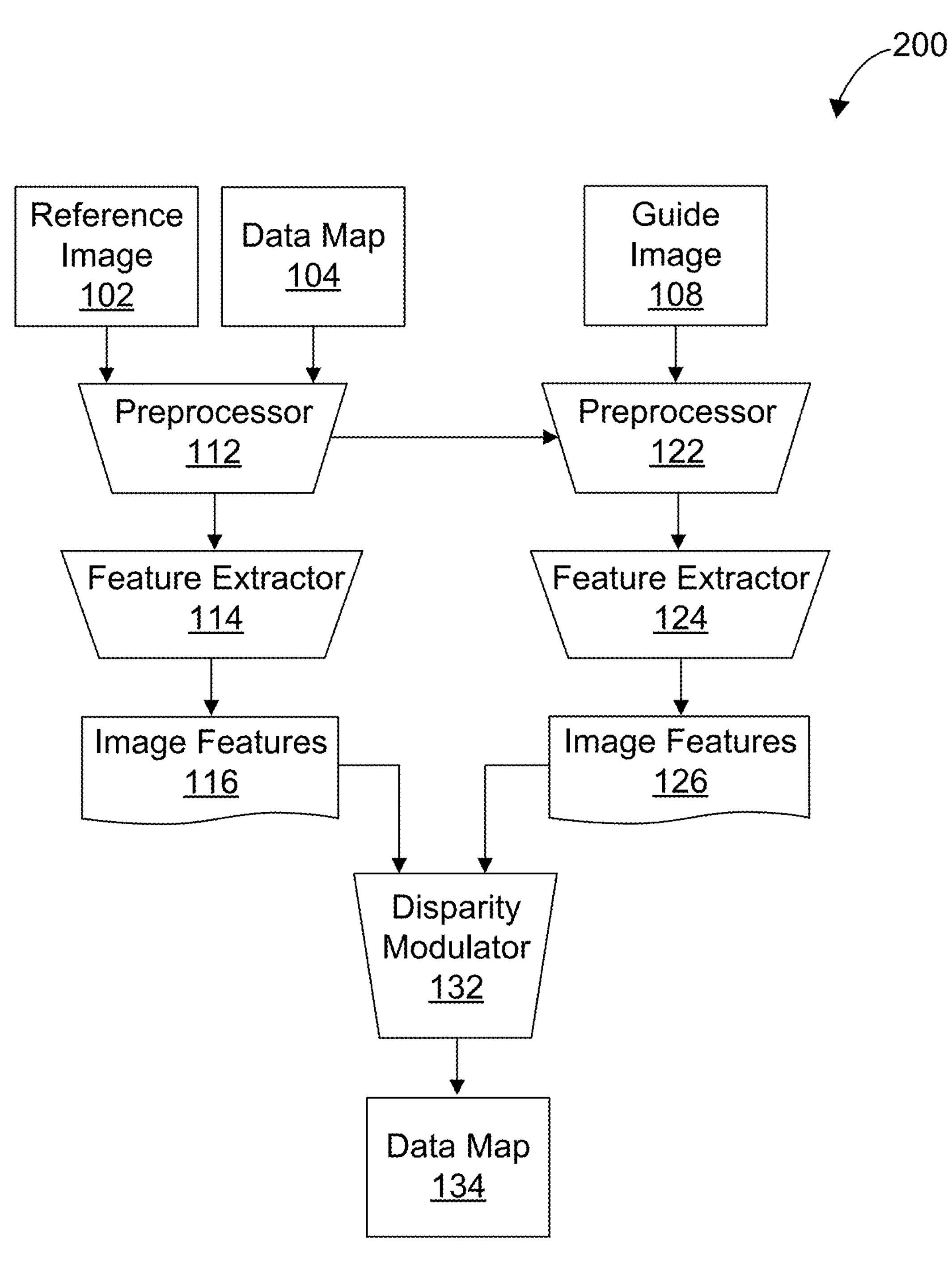
FIG. 2 is a block diagram illustrating a system including a subset of elements of the system of FIG. 1, according to various aspects of the present disclosure.

FIG. 2 is a block diagram illustrating a system 200 including a subset of elements of system 100 of FIG. 1, according to various aspects of the present disclosure. FIG. 2 illustrates a first aspect of system 100 of FIG. 1. Other deep learning (DL)-based refinement techniques may use only one feature-extraction branch. System 200 includes one feature-extraction branch for reference image 102 and data map 104 and another feature-extraction branch for guide image 108. Additionally or alternatively, other DL-based refinement techniques may refine data values based on an image and a data map. System 200 refines data values based on reference image 102, data map 104, and guide image 108. Advantages of system 200 includes, that system 200 removes unnecessary/superfluous data (e.g., from guide image 108) that may confuse completion/refinement. This helps separate foreground and background better to produce better edge alignment and object aware predictions.

Figure 3:
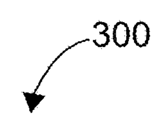
FIG. 3 is a block diagram illustrating a system including a subset of elements of the system of FIG. 1, according to various aspects of the present disclosure.
Figure 3:
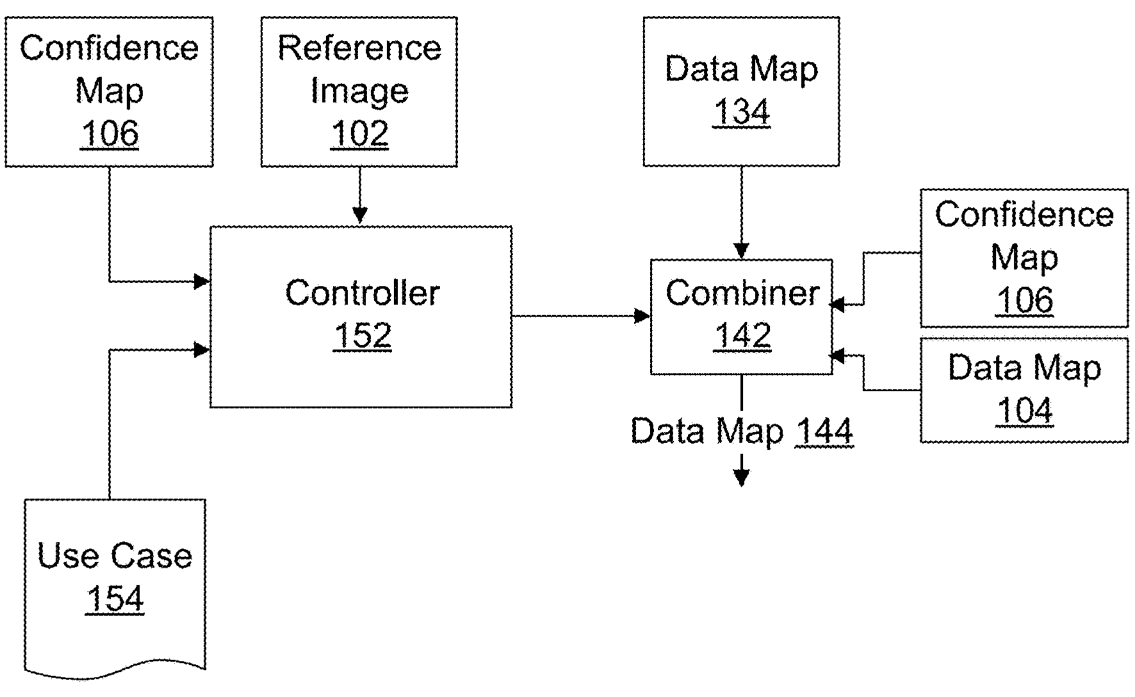

FIG. 3 is a block diagram illustrating a system 300 including a subset of elements of system 100 of FIG. 1, according to various aspects of the present disclosure. FIG. 3 illustrates a first aspect of system 100 of FIG. 1. Some other deep learning (DL)-based refinement techniques may not include a combiner to combine data maps with refined data maps. Some other DL-based refinement techniques may include a combiner and may combine data maps with refined data maps. System 300 includes controller 152 that may determine, for example, on a case-by-case basis, whether to refine data map 104 with data map 134. For example, controller 152 may decide whether to perform a confidence-based fusion on data map 104 based on quality of data map 104. If quality of data map 104 is poor, output from the network (e.g., data map 134) may be preferred over the fusion of data map 104 and data map 134.

Controller 152 may operate according to a number of criteria or factors. For example, controller 152 may include a set of use-cases suitable for confidence-based fusion. For instance, controller 152 may determine the set based on a signal-to-noise ratio (SNR), quality requirements, sparsity of the data map, and/or data source (e.g., time of flight (ToF) sensor(s), light-based or range-based sensor(s), and/or depth from stereo (DFS) source).

Figure 4:
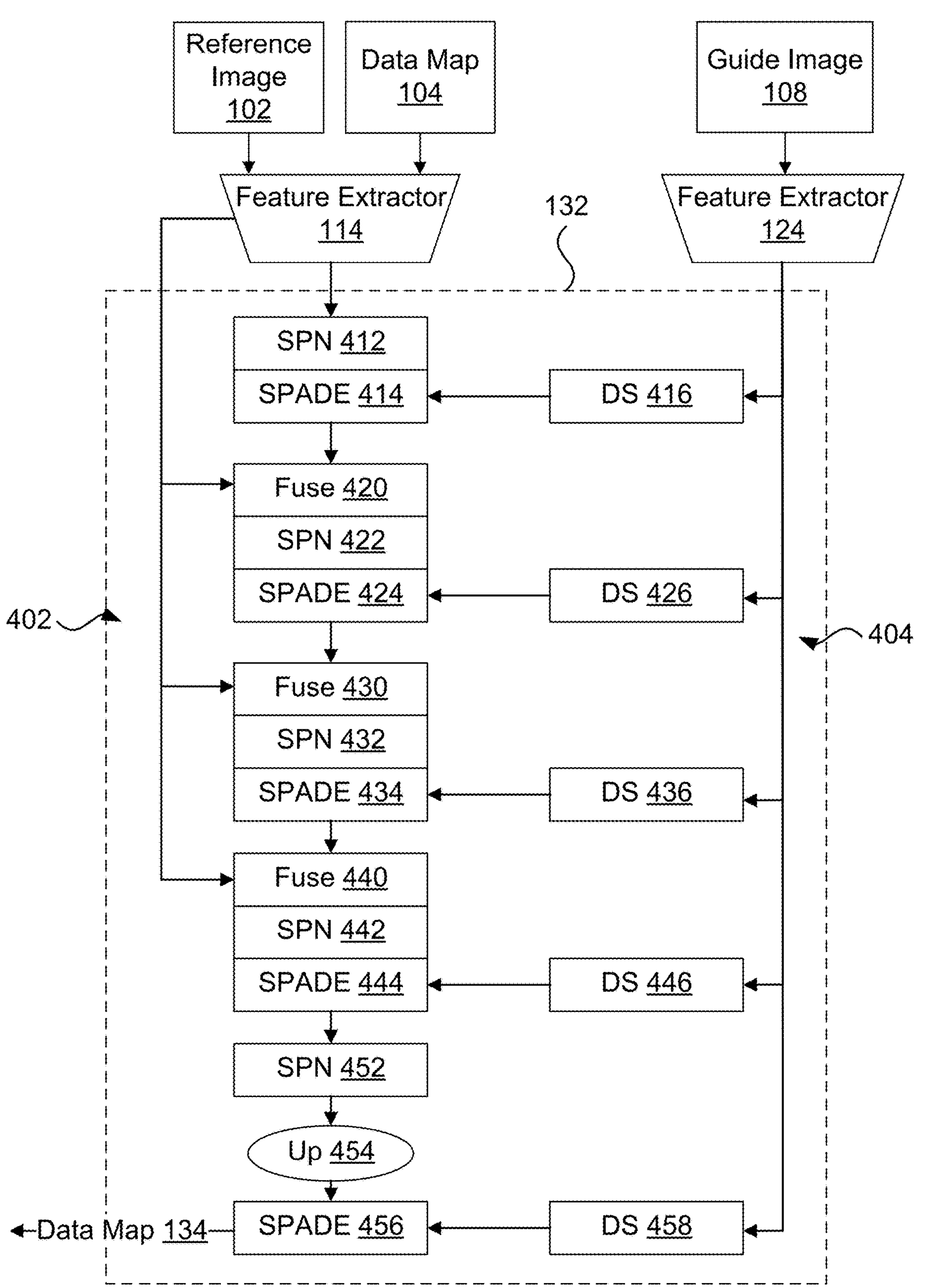
FIG. 4 is a block diagram illustrating an example implementation of the disparity modulator of FIG. 1, according to various aspects of the present disclosure.

FIG. 4 is a block diagram illustrating an example implementation of disparity modulator 132 of FIG. 1, according to various aspects of the present disclosure. In general, disparity modulator 132 may obtain features based on reference image 102 and data map 104 (e.g., generated by feature extractor 114) and features based on guide image 108 (e.g., based by feature extractor 124) and generate data map 134 based on the features. More specifically, disparity modulator 132 may include branch 402 for processing the features based on reference image 102 and data map 104 and branch 404 for processing features based on guide image 108.

Guide image 108 may be a segmentation map indicative of segments of reference image 102. As such, guide image 108 may lack texture. Because guide image 108 lacks texture, disparity modulator 132 may be better able to separate foreground and background better to produce better edge alignment and object aware predictions.

Disparity modulator 132 may perform deep-learning-based post-processing for disparity hole-filling. Disparity modulator 132 may update eye vergence angle (EVA) high-confidence values (e.g., disparity or depth values) by assuming low-confidence regions as holes. Disparity modulator 132 may to fill holes in data maps (e.g., disparity and/or depth maps) produced by EVA using a confidence map which indicate pixels with high confidence and which pixels should be considered as holes.

Disparity modulator 132 includes fuse blocks (e.g., fuse 420, fuse 430, and fuse 440), Spatial Propagation Network (SPN) blocks (e.g., SPN 412, SPN 422, SPN 432, SPN 442, and SPN 452), and SPation ADaptivE (SPADE) blocks (e.g., SPADE 414, SPADE 424, SPADE 434, SPADE 444, and SPADE 456).

In general, fuse blocks (e.g., fuse 420, fuse 430, and fuse 440) may combine information from the feature extractor 114 with the information in the decoder in the form of a skip connection. The fuse blocks provide skip connections that takes the backbone features extracted from data map 104 connects the features so disparity modulator 132 does not lose track of the initial values.

Figure 5:
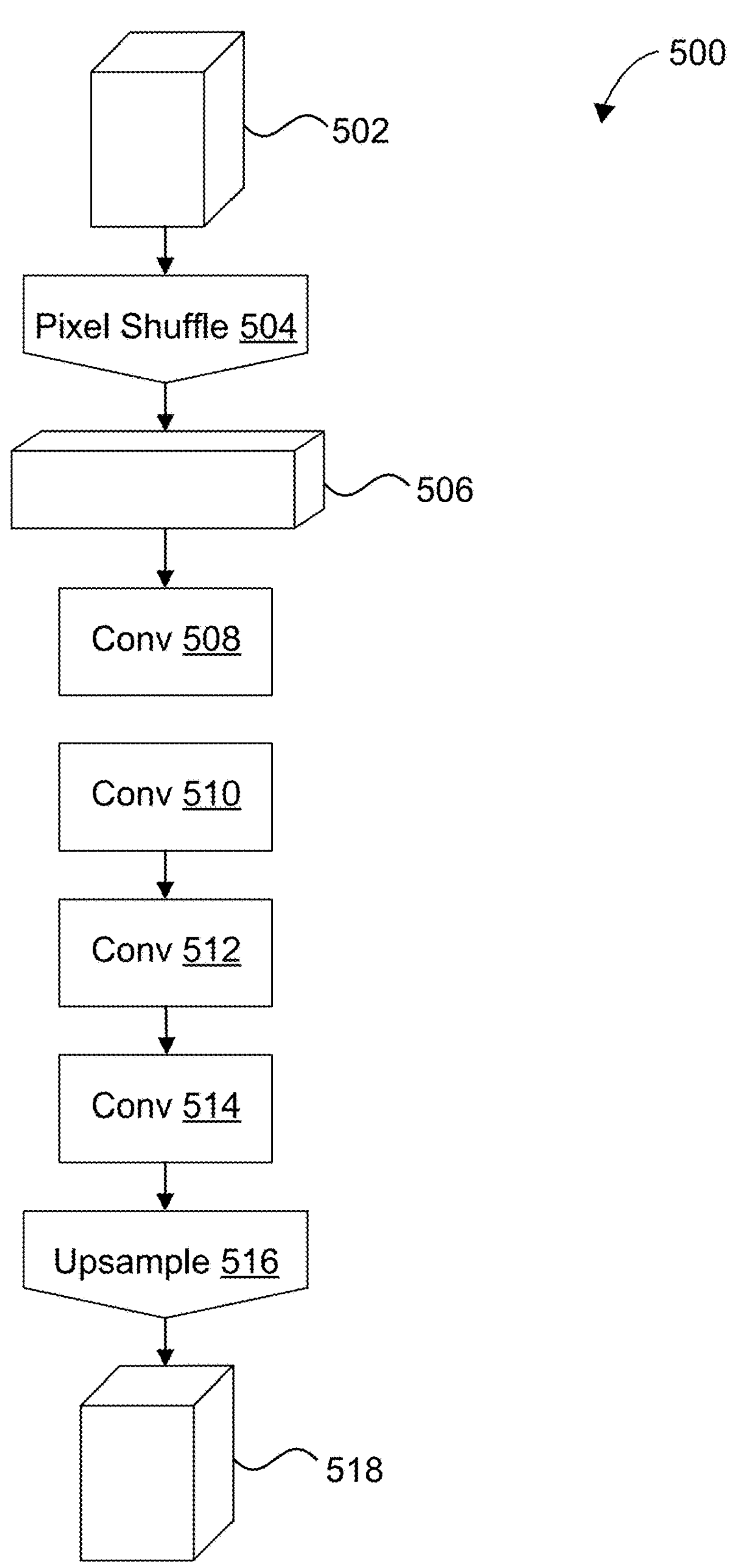
FIG. 5 includes an example implementation of a Spatial Propagation (SPN) block, according to various aspects of the present disclosure.

In general SPN blocks (e.g., SPN 412, SPN 422, SPN 432, SPN 442, and SPN 452), may propagate information by shuffling spatial information into channel-level representation and using learned weights to update local neighborhoods. The SPN blocks may be responsible for propagation of information. FIG. 5 includes an example implementation of an SPN block.

Figure 6:
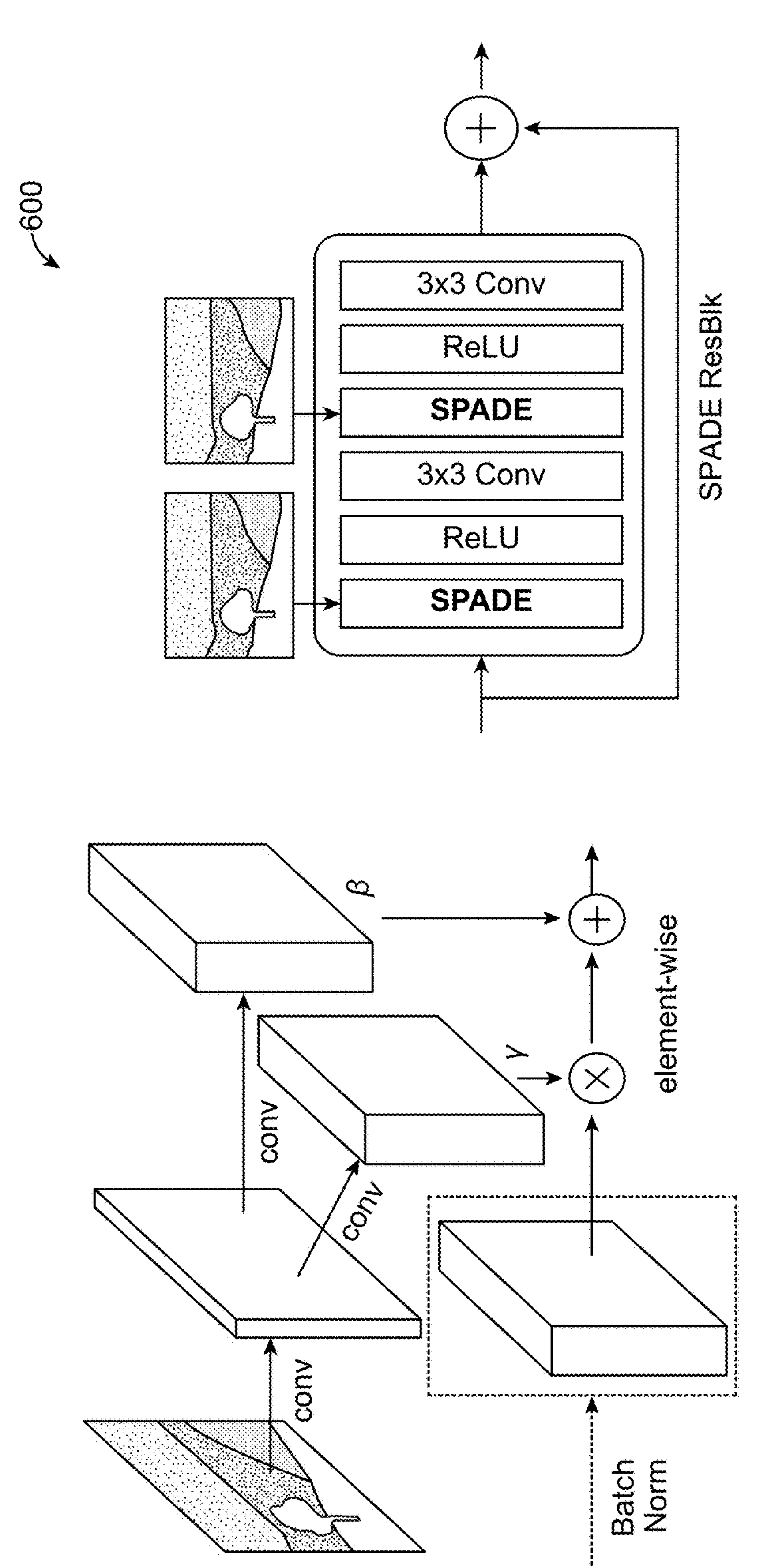
FIG. 6 includes an example implementation of a SPation ADaptivE (SPADE) block, according to various aspects of the present disclosure.

In general SPADE blocks (e.g., SPADE 414, SPADE 424, SPADE 434, SPADE 444, and SPADE 456) may act as a deep-guided filter to use the guide information from the corresponding feature extractor to align the features in the decoder to get more edge aligned and object aware predictions. The SPADE blocks may handle the modulation of information. FIG. 6 includes an example implementation of a SPADE block.

Feature extractor 124 may extract features from guide image 108. Feature extractor 124 may be, or may include, a set of convolutional blocks that extract features from guide image 108.

Disparity modulator 132 may be trained using intermediate supervision with a log loss objective function after each block to make the model more robust. The log loss objective function may compute the absolute difference of the log values of ground truth and prediction.

FIG. 5 includes an example implementation of a Spatial Propagation (SPN) block 500, according to various aspects of the present disclosure. For example, SPN block 500 of FIG. 5 may be an example of any of SPN 412, SPN 422, SPN 432, SPN 442, and/or SPN 452 of FIG. 4.

SPN block 500 may update local neighborhoods using a large receptive field. Spatial information from a feature map (e.g., feature map 502) may be shuffled to represent spatial information along the channel axis. The weights for this block may be shared across multiple resolutions of the architecture for more robust hole filling.

SPN block 500 may obtain a feature map 502, and rearranged data of feature map 502 (at pixel shuffle 504) into a different dimensionality, resulting in feature map 506. For example, feature map 502 may have dimensions B×C×H×W (where B represents batch, where C represents channels, where H represents height, and W represents width) and feature map 506 may have dimensions B×4C×H/2*W/2.

Each of convolutional block 508, convolutional block 510, convolutional block 512, and convolutional block 514 may be, or may include, one or more convolutional layers (e.g., 3×3 convolutional layers). Upsample 516 may upsample an output of convolutional block 514 to generate feature map 518. Feature map 518 may have dimensions B×C×H×W.

FIG. 6 includes an example implementation of a SPation ADaptivE (SPADE) block 600, according to various aspects of the present disclosure. For example, SPADE block 600 of FIG. 6 may be an example of any of SPADE 414, SPADE 424, SPADE 434, SPADE 444, and SPADE 456 of FIG. 4.

Spatial adaptation takes semantic features extracted at different resolutions from the guide image to drive modulation of disparity features. A different SPADE block is used at each resolution and these weights are not shared as different guide features maybe needed at each resolution to drive depth completion. While the propagation block propagates depth, the SPADE block helps respect object structure.

Figure 7:
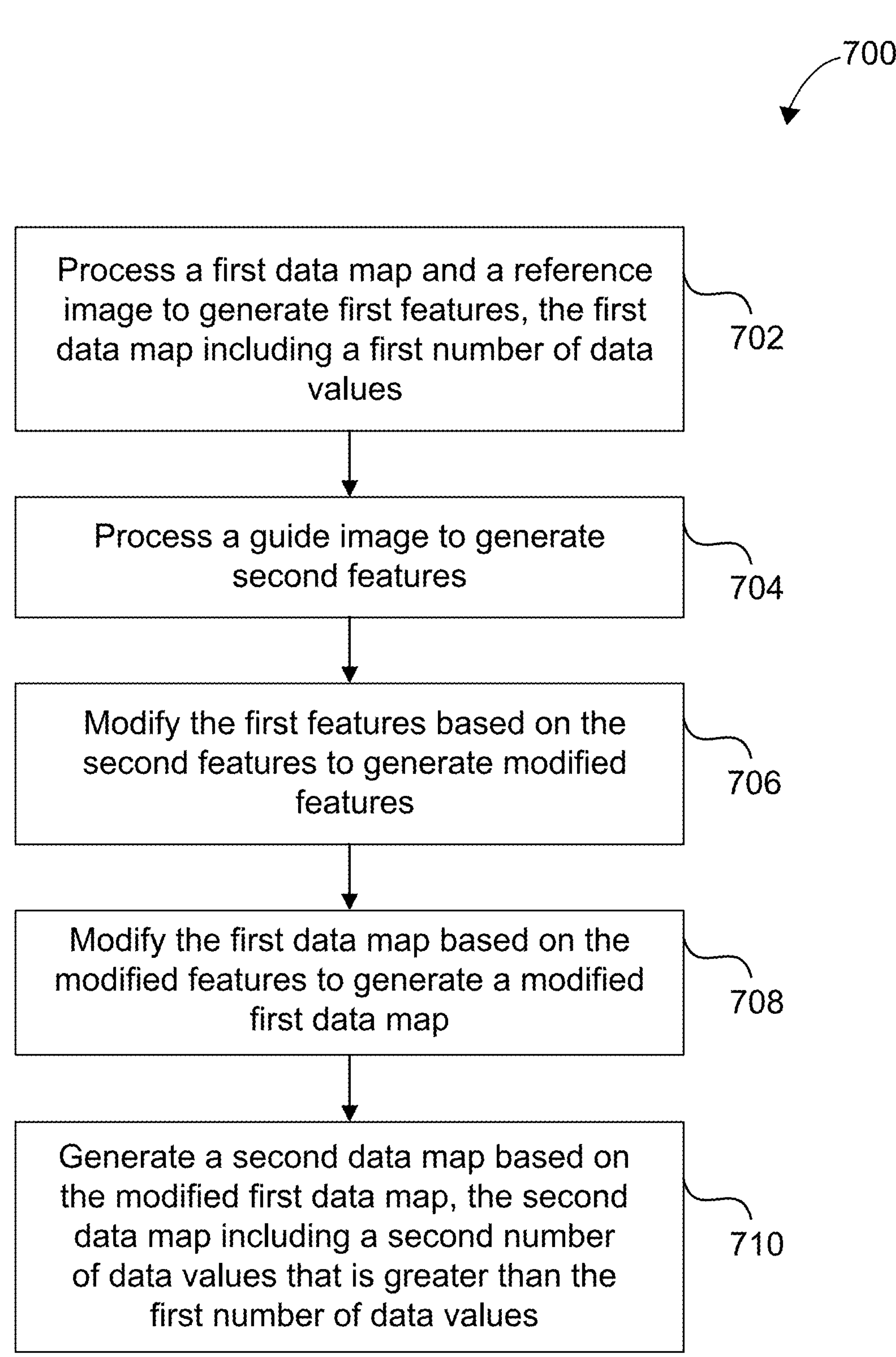
FIG. 7 is a flow diagram illustrating another example process for refining disparity and/or depth maps, in accordance with aspects of the present disclosure.

FIG. 7 is a flow diagram illustrating a process 700 for refining disparity and/or depth maps, in accordance with aspects of the present disclosure. One or more operations of process 700 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 700. The one or more operations of process 700 may be implemented as software components that are executed and run on one or more processors.

At block 702, a computing device (or one or more components thereof) may process a first data map and a reference image to generate first features, the first data map including a first number of data values. For example, preprocessor 112 of FIG. 1 and FIG. 2 and feature extractor 114 of FIG. 1 and FIG. 2 may process reference image 102 of FIG. 1 and FIG. 2 and data map 104 of FIG. 1 and FIG. 2 to generate image features 116 of FIG. 1 and FIG. 2.

In some aspects, the first data map and the reference image may be processed to generate the first features using a machine-learning model trained to generate features based on images and data maps. For example, feature extractor 114 of FIG. 1 and FIG. 2 may be, or may include, a machine-learning model.

At block 704, the computing device (or one or more components thereof) may process a guide image to generate second features. For example, preprocessor 122 of FIG. 1 and FIG. 2 and feature extractor 124 of FIG. 1 and FIG. 2 may process guide image 108 of FIG. 1 and FIG. 2 to generate image features 126 of FIG. 1 and FIG. 2.

In some aspects, the guide image may be processed to generate the second features using a machine-learning model trained to generate features based on images. For example, feature extractor 124 of FIG. 1 and FIG. 2 may be, or may include, a machine-learning model.

In some aspects, the guide image may be, or may include, the reference image. In some aspects, the guide image may be, or may include, a segmentation map based on the reference image.

At block 706, the computing device (or one or more components thereof) may modify the first features based on the second features to generate modified features. For example, disparity modulator 132 of FIG. 1 and FIG. 2 may modify image features 116 based on image features 126 to generate modified image features (internal to disparity modulator 132 and not illustrated in FIG. 1 or in FIG. 2). As another example, disparity modulator 132 of FIG. 4 may modify features based on reference image 102 of FIG. 4 and data map 104 of FIG. 4 based on features based on guide image 108 of FIG. 4.

In some aspects, to modify the first features based on the second features, the computing device (or one or more components thereof) may process the first features and the second features using a machine-learning model trained to modify features. For example, system 100 of FIG. 1 and FIG. 2 may process image features 116 and image features 126 using disparity modulator 132 which may be, or may include, one or more machine-learning models (e.g., as described with regard to FIG. 4).

In some aspects, to modify the first features based on the second features, the computing device (or one or more components thereof) may process the first features and the second features using an image-guided disparity-modulation machine-learning model. For example, disparity modulator 132 of FIG. 1, FIG. 2, and FIG. 4 may be, or may include, an image-guided disparity-modulation machine-learning model.

At block 708, the computing device (or one or more components thereof) may modify the first data map based on the modified features to generate a modified first data map. For example, disparity modulator 132 may generate data map 134 of FIG. 1 and FIG. 2 based on image features 116 and image features 126. For example, disparity modulator 132 may modify data map 104 based on the modified image features generated at block 706 to generate data map 134.

In some aspects, to modify the first features based on the second features to generate modified features and to modify the first data map based on the modified features to generate a modified first data map, the computing device (or one or more components thereof) may inject image features of the second features into the data map. For example, block 706 and block 708 may be, or may include, inject image features of the second features (e.g., image features 126) into the data map (e.g., data map 104).

At block 710, the computing device (or one or more components thereof) may generate a second data map based on the modified first data map, the second data map including a second number of data values that is greater than the first number of data values. For example, combiner 142 of FIG. 1 and FIG. 3 may generate data map 144 of FIG. 1 and FIG. 3 based data map 134 of FIG. 1 and FIG. 3 and data map 104 of FIG. 1 and FIG. 3. Data map 144 may have more data values that data map 104. For example, data map 144 may have a higher resolution than data map 104. Additionally or alternatively, data map 144 may have fewer holes than data map 104.

In some aspects, to generate the second data map, the computing device (or one or more components thereof) may combine the first data map with the modified first data map based on a confidence map related to the first data map. For example, combiner 142 of FIG. 1 and FIG. 3 may combine data map 104 with data map 134 based on confidence map 106.

In some aspects, the first data map may be, or may include, a first depth map, wherein the first number of data values includes the first number of depth values indicative of depths of the first number of points of a scene, wherein the second data map may be, or may include, a second data map, and wherein the second number of data values includes the second number of depth values.

In some aspects, the first data map may be, or may include, a first disparity map, wherein the first number of data values includes the first number of disparity values indicative of distances between matching points of paired images of a scene, wherein the second data map may be, or may include, a second disparity map, and wherein the second number of data values includes the second number of disparity values.

In some aspects, the computing device (or one or more components thereof) may further detect objects based on the second data map; reconstruct a scene based on the second data map; generate data for an extended-reality (XR) application based on the second data map; control a vehicle based on the second data map; provide information to a driver of a vehicle based on the second data map; control a robot based on the second data map; or modify an image based on the second data map.

In some examples, as noted previously, the methods described herein (e.g., process 700 of FIG. 7, and/or other methods described herein) can be performed, in whole or in part, by a computing device or apparatus. In one example, one or more of the methods can be performed by system 100 of FIG. 1, or by another system or device. In another example, one or more of the methods (e.g., process 700 of FIG. 7, and/or other methods described herein) can be performed, in whole or in part, by the computing-device architecture 1000 shown in FIG. 10. For instance, a computing device with the computing-device architecture 1000 shown in FIG. 10 can include, or be included in, the components of the system 100 and can implement the operations of process 700, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 700, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 700, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 8:
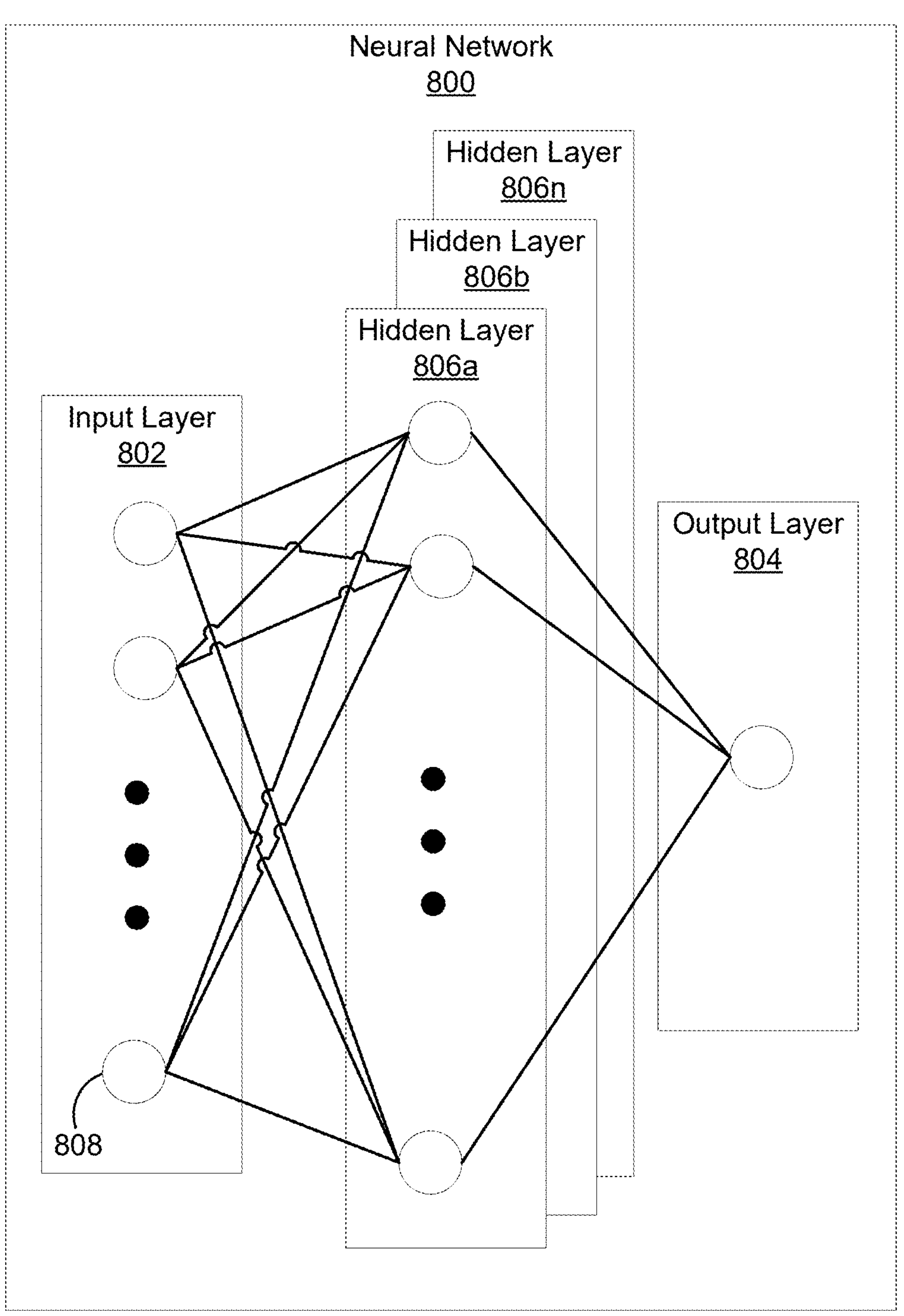
FIG. 8 is a block diagram illustrating an example of a deep learning neural network that can be used to perform various tasks, according to some aspects of the disclosed technology.

FIG. 8 is an illustrative example of a neural network 800 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 800 may be an example of, or can implement, any or all of preprocessor 112 of FIG. 1, feature extractor 114 of FIG. 1, preprocessor 122 of FIG. 1, feature extractor 124 of FIG. 1, disparity modulator 132 of FIG. 1, postprocessor 146 of FIG. 1, convolutional block 508 of FIG. 5, convolutional block 510 of FIG. 5, convolutional block 512 of FIG. 5, convolutional block 514 of FIG. 5, and/or one or more elements of SPADE block 600 of FIG. 6.

An input layer 802 includes input data. In one illustrative example, input layer 802 can include data representing any or all of reference image 102 of FIG. 1, data map 104 of FIG. 1, confidence map 106 of FIG. 1, guide image 108 of FIG. 1, image features 116 of FIG. 1, image features 126 of FIG. 1, data map 134 of FIG. 1, and/or data map 144 of FIG. 1. Neural network 800 includes multiple hidden layers hidden layers 806*a*, 806*b*, through 806*n*. The hidden layers 806*a*, 806*b*, through hidden layer 806*n* include "n" number of hidden layers, where "n" is an integer greater than or equal to one. The number of hidden layers can be made to include as many layers as needed for the given application. Neural network 800 further includes an output layer 804 that provides an output resulting from the processing performed by the hidden layers 806*a*, 806*b*, through 806*n*. In one illustrative example, output layer 804 can provide image features 116 of FIG. 1, image features 126 of FIG. 1, data map 134 of FIG. 1, data map 144 of FIG. 1, data map 148 of FIG. 1, Neural network 800 may be, or may include, a multi-layer neural network of interconnected nodes. Each node can represent a piece of information. Information associated with the nodes is shared among the different layers and each layer retains information as information is processed. In some cases, neural network 800 can include a feed-forward network, in which case there are no feedback connections where outputs of the network are fed back into itself. In some cases, neural network 800 can include a recurrent neural network, which can have loops that allow information to be carried across nodes while reading in input.

Information can be exchanged between nodes through node-to-node interconnections between the various layers. Nodes of input layer 802 can activate a set of nodes in the first hidden layer 806*a*. For example, as shown, each of the input nodes of input layer 802 is connected to each of the nodes of the first hidden layer 806*a*. The nodes of first hidden layer 806*a* can transform the information of each input node by applying activation functions to the input node information. The information derived from the transformation can then be passed to and can activate the nodes of the next hidden layer 806*b*, which can perform their own designated functions. Example functions include convolutional, up-sampling, data transformation, and/or any other suitable functions. The output of the hidden layer 806*b* can then activate nodes of the next hidden layer, and so on. The output of the last hidden layer 806*n* can activate one or more nodes of the output layer 804, at which an output is provided. In some cases, while nodes (e.g., node 808) in neural network 800 are shown as having multiple output lines, a node has a single output and all lines shown as being output from a node represent the same output value.

In some cases, each node or interconnection between nodes can have a weight that is a set of parameters derived from the training of neural network 800. Once neural network 800 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 800 to be adaptive to inputs and able to learn as more and more data is processed.

Neural network 800 may be pre-trained to process the features from the data in the input layer 802 using the different hidden layers 806*a*, 806*b*, through 806*n* in order to provide the output through the output layer 804. In an example in which neural network 800 is used to identify features in images, neural network 800 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 800 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 800 is trained well enough so that the weights of the layers are accurately tuned.

For the example of identifying objects in images, the forward pass can include passing a training image through neural network 800. The weights are initially randomized before neural network 800 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 800, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 800 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as. The loss can be set to be equal to the value of Etotal.

The loss (or error) will be high for the first training images since the actual values will be much different than the predicted output. The goal of training is to minimize the amount of loss so that the predicted output is the same as the training label. Neural network 800 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as, where w denotes a weight, wi denotes the initial weight, and n denotes a learning rate. The learning rate can be set to any suitable value, with a high learning rate including larger weight updates and a lower value indicating smaller weight updates.

Neural network 800 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 800 can include any other deep network other than a CNN, such as an autoencoder, a deep belief nets (DBNs), a Recurrent Neural Networks (RNNs), among others.

Figure 9:
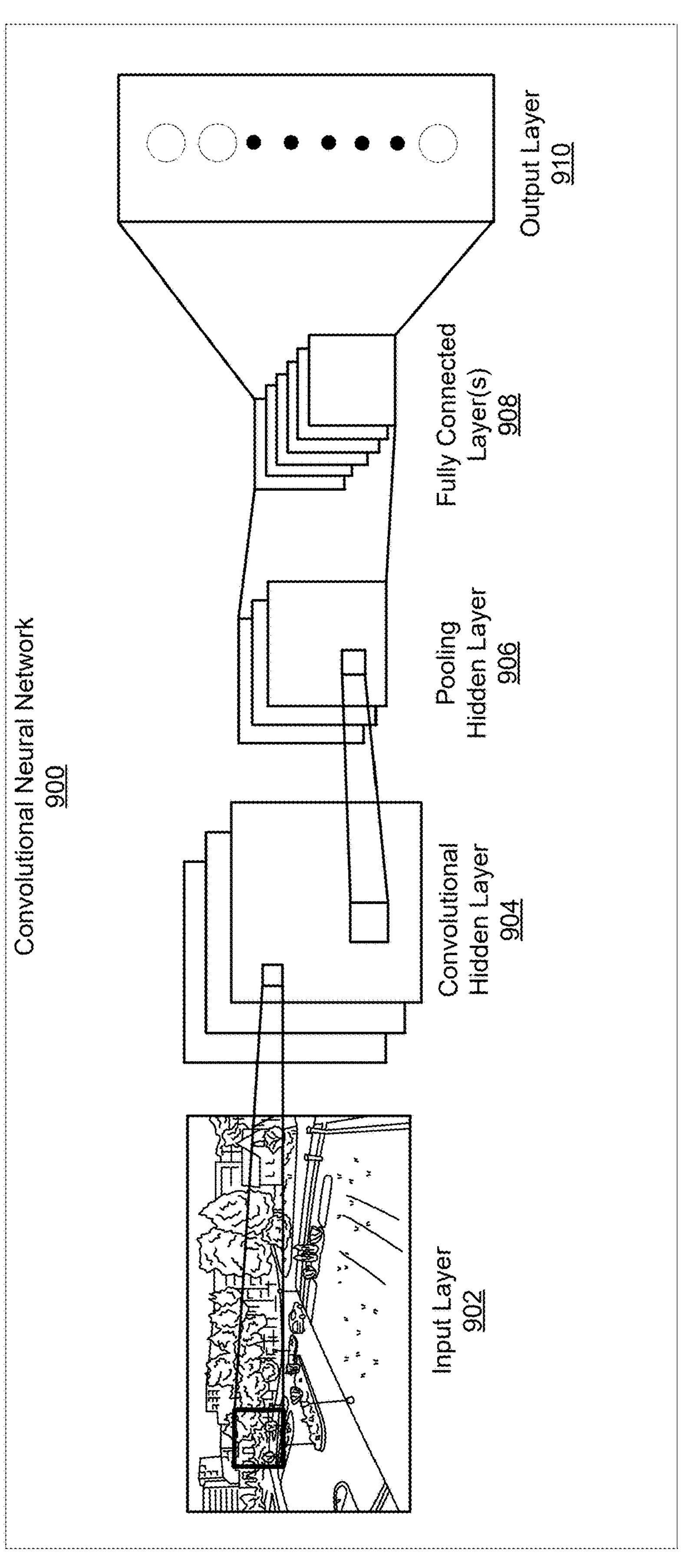
FIG. 9 is a block diagram illustrating an example of a convolutional neural network (CNN), according to various aspects of the present disclosure.

FIG. 9 is an illustrative example of a convolutional neural network (CNN) 900. The input layer 902 of the CNN 900 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 904, an optional non-linear activation layer, a pooling hidden layer 906, and fully connected layer 908 (which fully connected layer 908 can be hidden) to get an output at the output layer 910. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a single class of an object or can include a probability of classes that best describe the object in the image.

The first layer of the CNN 900 can be the convolutional hidden layer 904. The convolutional hidden layer 904 can analyze image data of the input layer 902. Each node of the convolutional hidden layer 904 is connected to a region of nodes (pixels) of the input image called a receptive field. The convolutional hidden layer 904 can be considered as one or more filters (each filter corresponding to a different activation or feature map), with each convolutional iteration of a filter being a node or neuron of the convolutional hidden layer 904. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 904. Each connection between a node and a receptive field for that node learns a weight and, in some cases, an overall bias such that each node learns to analyze its particular local receptive field in the input image. Each node of the convolutional hidden layer 904 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 904 is due to each node of the convolutional layer being applied to its corresponding receptive field. For example, a filter of the convolutional hidden layer 904 can begin in the top-left corner of the input image array and can convolve around the input image. As noted above, each convolutional iteration of the filter can be considered a node or neuron of the convolutional hidden layer 904. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 904. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 904.

The mapping from the input layer to the convolutional hidden layer 904 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 904 can include several activation maps in order to identify multiple features in an image. The example shown in FIG. 9 includes three activation maps. Using three activation maps, the convolutional hidden layer 904 can detect three different kinds of features, with each feature being detectable across the entire image.

In some examples, a non-linear hidden layer can be applied after the convolutional hidden layer 904. The non-linear layer can be used to introduce non-linearity to a system that has been computing linear operations. One illustrative example of a non-linear layer is a rectified linear unit (ReLU) layer. A ReLU layer can apply the function f(x)=max (0, x) to all of the values in the input volume, which changes all the negative activations to 0. The ReLU can thus increase the non-linear properties of the CNN 900 without affecting the receptive fields of the convolutional hidden layer 904.

The pooling hidden layer 906 can be applied after the convolutional hidden layer 904 (and after the non-linear hidden layer when used). The pooling hidden layer 906 is used to simplify the information in the output from the convolutional hidden layer 904. For example, the pooling hidden layer 906 can take each activation map output from the convolutional hidden layer 904 and generates a condensed activation map (or feature map) using a pooling function. Max-pooling is one example of a function performed by a pooling hidden layer. Other forms of pooling functions be used by the pooling hidden layer 906, such as average pooling, L2-norm pooling, or other suitable pooling functions. A pooling function (e.g., a max-pooling filter, an L2-norm filter, or other suitable pooling filter) is applied to each activation map included in the convolutional hidden layer 904. In the example shown in FIG. 9, three pooling filters are used for the three activation maps in the convolutional hidden layer 904.

In some examples, max-pooling can be used by applying a max-pooling filter (e.g., having a size of 2×2) with a stride (e.g., equal to a dimension of the filter, such as a stride of 2) to an activation map output from the convolutional hidden layer 904. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 904 having a dimension of 24×24 nodes, the output from the pooling hidden layer 906 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 906 to every one of the output nodes in the output layer 910. Using the example above, the input layer includes 28×28 nodes encoding the pixel intensities of the input image, the convolutional hidden layer 904 includes 3×24×24 hidden feature nodes based on application of a 5×5 local receptive field (for the filters) to three activation maps, and the pooling hidden layer 906 includes a layer of 3×12×12 hidden feature nodes based on application of max-pooling filter to 2×2 regions across each of the three feature maps. Extending this example, the output layer 910 can include ten output nodes. In such an example, every node of the 3×12×12 pooling hidden layer 906 is connected to every node of the output layer 910.

The fully connected layer 908 can obtain the output of the previous pooling hidden layer 906 (which should represent the activation maps of high-level features) and determines the features that most correlate to a particular class. For example, the fully connected layer 908 can determine the high-level features that most strongly correlate to a particular class and can include weights (nodes) for the high-level features. A product can be computed between the weights of the fully connected layer 908 and the pooling hidden layer 906 to obtain probabilities for the different classes. For example, if the CNN 900 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 910 can include an M-dimensional vector (in the prior example, M=10). M indicates the number of classes that the CNN 900 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

In some aspects, training of one or more of the machine learning systems or neural networks described herein (e.g., one or more components of the system 100 of FIG. 1 such as the feature extractor 114, the feature extractor 124, the segmenter or other component of the system 100, among various other machine learning systems or networks of FIGS. 1-6, etc.) can be performed using online training, offline training, and/or various combinations of online and offline training. In some cases, online may refer to time periods during which the input data (e.g., such as the reference image 102, the data map 104, and/or the guide image 108 of FIGS. 1-4, etc.) is processed, for instance for performance of the data map refinement (e.g., depth map refinement, disparity map refinement, etc.) processing implemented by the systems and techniques described herein. In some examples, offline may refer to idle time periods or time periods during which input data is not being processed. Additionally, offline may be based on one or more time conditions (e.g., after a particular amount of time has expired, such as a day, a week, a month, etc.) and/or may be based on various other conditions such as network and/or server availability, etc., among various others.

Figure 10:
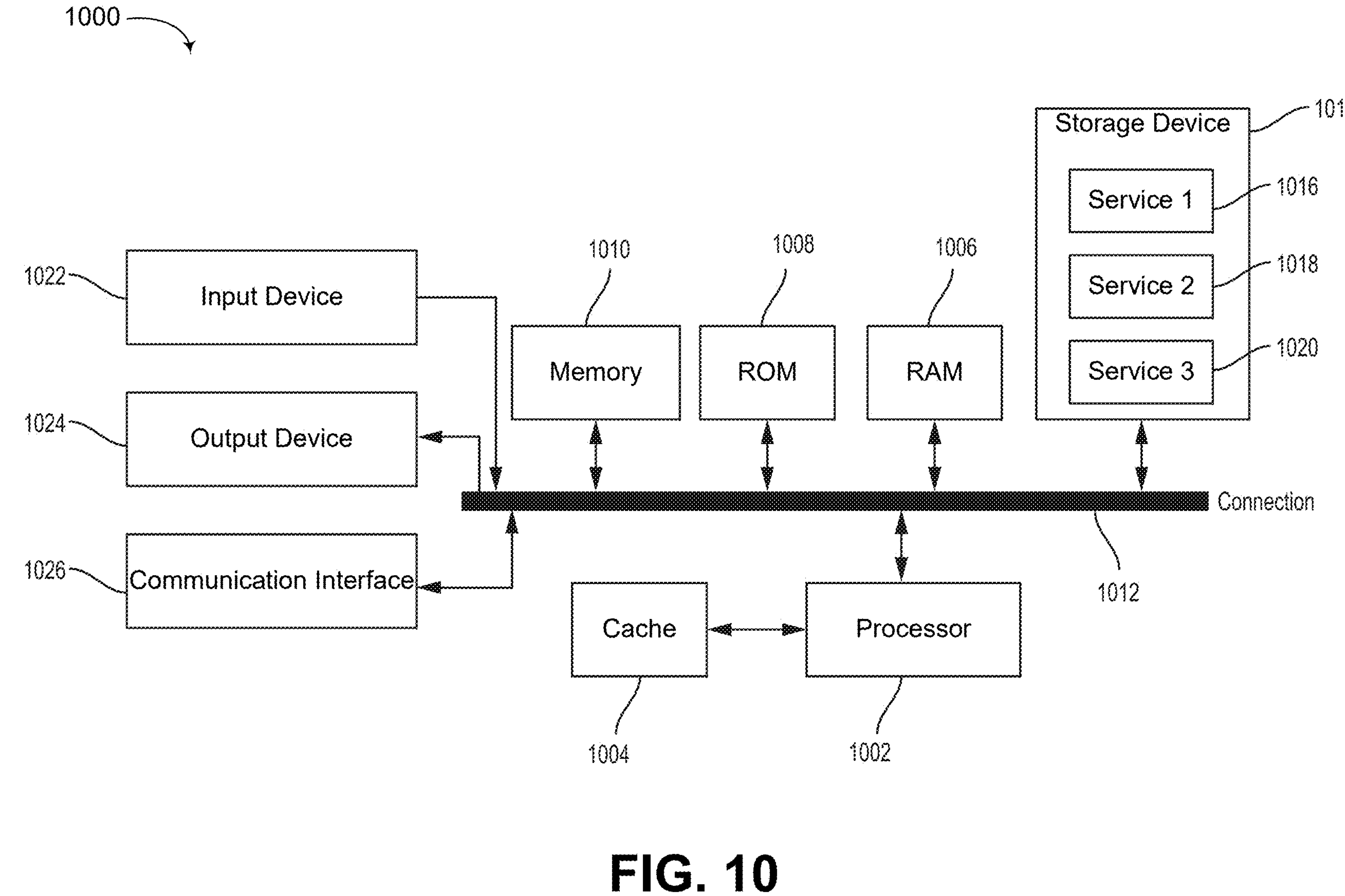
FIG. 10 is a block diagram illustrating an example computing-device architecture of an example computing device which can implement the various techniques described herein.

FIG. 10 illustrates an example computing-device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1000 may include, implement, or be included in any or all of system 100 of FIG. 1. Additionally or alternatively, computing-device architecture 1000 may be configured to perform process 700, and/or other process described herein.

The components of computing-device architecture 1000 are shown in electrical communication with each other using connection 1012, such as a bus. The example computing-device architecture 1000 includes a processing unit (CPU or processor) 1002 and computing device connection 1012 that couples various computing device components including computing device memory 1010, such as read only memory (ROM) 1008 and random-access memory (RAM) 1006, to processor 1002.

Computing-device architecture 1000 can include a cache of high-speed memory connected directly with, in close proximity to, or integrated as part of processor 1002. Computing-device architecture 1000 can copy data from memory 1010 and/or the storage device 1014 to cache 1004 for quick access by processor 1002. In this way, the cache can provide a performance boost that avoids processor 1002 delays while waiting for data. These and other modules can control or be configured to control processor 1002 to perform various actions. Other computing device memory 1010 may be available for use as well. Memory 1010 can include multiple different types of memory with different performance characteristics. Processor 1002 can include any general-purpose processor and a hardware or software service, such as service 1 1016, service 2 1018, and service 3 1020 stored in storage device 1014, configured to control processor 1002 as well as a special-purpose processor where software instructions are incorporated into the processor design. Processor 1002 may be a self-contained system, containing multiple cores or processors, a bus, memory controller, cache, etc. A multi-core processor may be symmetric or asymmetric.

To enable user interaction with the computing-device architecture 1000, input device 1022 can represent any number of input mechanisms, such as a microphone for speech, a touch-sensitive screen for gesture or graphical input, keyboard, mouse, motion input, speech and so forth. Output device 1024 can also be one or more of a number of output mechanisms known to those of skill in the art, such as a display, projector, television, speaker device, etc. In some instances, multimodal computing devices can enable a user to provide multiple types of input to communicate with computing-device architecture 1000. Communication interface 1026 can generally govern and manage the user input and computing device output. There is no restriction on operating on any particular hardware arrangement and therefore the basic features here may easily be substituted for improved hardware or firmware arrangements as they are developed.

Storage device 1014 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1006, read only memory (ROM) 1008, and hybrids thereof. Storage device 1014 can include services 1016, 1018, and 1020 for controlling processor 1002. Other hardware or software modules are contemplated. Storage device 1014 can be connected to the computing device connection 1012. In one aspect, a hardware module that performs a particular function can include the software component stored in a computer-readable medium in connection with the necessary hardware components, such as processor 1002, connection 1012, output device 1024, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for modifying a map, the apparatus comprising: one or more memory; and one or more processors coupled to the one or more memory and configured to: process a first data map and a reference image to generate first features, the first data map including a first number of data values; process a guide image to generate second features; modify the first features based on the second features to generate modified features; modify the first data map based on the modified features to generate a modified first data map; and generate a second data map based on the modified first data map, the second data map including a second number of data values that is greater than the first number of data values.

Aspect 2. The apparatus of aspect 1, wherein, to modify the first features based on the second features, the one or more processors are configured to process the first features and the second features using a machine-learning model trained to modify features.

Aspect 3. The apparatus of any one of aspects 1 or 2, wherein, to modify the first features based on the second features, the one or more processors are configured to process the first features and the second features using an image-guided disparity-modulation machine-learning model.

Aspect 4. The apparatus of any one of aspects 1 to 3, wherein, to modify the first features based on the second features to generate modified features and to modify the first data map based on the modified features to generate a modified first data map, the one or more processors are configured to inject image features of the second features into the data map.

Aspect 5. The apparatus of any one of aspects 1 to 4, wherein, to generate the second data map, the one or more processors are configured to combine the first data map with the modified first data map based on a confidence map related to the first data map.

Aspect 6. The apparatus of any one of aspects 1 to 5, wherein the first data map comprises a first depth map, wherein the first number of data values includes the first number of depth values indicative of depths of the first number of points of a scene, wherein the second data map comprises a second data map, and wherein the second number of data values includes the second number of depth values.

Aspect 7. The apparatus of any one of aspects 1 to 6, wherein the first data map comprises a first disparity map, wherein the first number of data values includes the first number of disparity values indicative of distances between matching points of paired images of a scene, wherein the second data map comprises a second disparity map, and wherein the second number of data values includes the second number of disparity values.

Aspect 8. The apparatus of any one of aspects 1 to 7, wherein the first data map and the reference image are processed to generate the first features using a machine-learning model trained to generate features based on images and data maps.

Aspect 9. The apparatus of any one of aspects 1 to 8, wherein the guide image is processed to generate the second features using a machine-learning model trained to generate features based on images.

Aspect 10. The apparatus of any one of aspects 1 to 9, wherein the guide image comprises the reference image.

Aspect 11. The apparatus of any one of aspects 1 to 10, wherein the guide image comprises a segmentation map based on the reference image.

Aspect 12. The apparatus of any one of aspects 1 to 11, further comprising a camera configured to capture at least one of the reference image or the guide image.

Aspect 13. The apparatus of any one of aspects 1 to 12, further comprising two cameras a predetermined distance apart, wherein one of the two cameras is configured to capture the reference image and the other of the two cameras is configured to capture a paired image and wherein the one or more processors are configured to determine the data map based on the reference image and the paired image.

Aspect 14. The apparatus of any one of aspects 1 to 13, wherein the at least one processor is further configured to at least one of: detect objects based on the second data map; reconstruct a scene based on the second data map; generate data for an extended-reality (XR) application based on the second data map; control a vehicle based on the second data map; provide information to a driver of a vehicle based on the second data map; control a robot based on the second data map; or modify an image based on the second data map.

Aspect 15. A method for modifying a map, the method comprising: processing a first data map and a reference image to generate first features, the first data map including a first number of data values; processing a guide image to generate second features; modifying the first features based on the second features to generate modified features; modifying the first data map based on the modified features to generate a modified first data map; and generating a second data map based on the modified first data map, the second data map including a second number of data values that is greater than the first number of data values.

Aspect 16. The method of aspect 15, wherein modifying the first features based on the second features comprises processing the first features and the second features using a machine-learning model trained to modify features.

Aspect 17. The method of any one of aspects 15 or 16, wherein modifying the first features based on the second features comprises processing the first features and the second features using an image-guided disparity-modulation machine-learning model.

Aspect 18. The method of any one of aspects 15 to 17, wherein modifying the first features based on the second features to generate modified features and modifying the first data map based on the modified features to generate a modified first data map comprises injecting image features of the second features into the data map.

Aspect 19. The method of any one of aspects 15 to 18, wherein generating the second data map comprises combining the first data map with the modified first data map based on a confidence map related to the first data map.

Aspect 20. The method of any one of aspects 15 to 19, wherein the first data map comprises a first depth map, wherein the first number of data values includes the first number of depth values indicative of depths of the first number of points of a scene, wherein the second data map comprises a second data map, and wherein the second number of data values includes the second number of depth values.

Aspect 21. The method of any one of aspects 15 to 20, wherein the first data map comprises a first disparity map, wherein the first number of data values includes the first number of disparity values indicative of distances between matching points of paired images of a scene, wherein the second data map comprises a second disparity map, and wherein the second number of data values includes the second number of disparity values.

Aspect 22. The method of any one of aspects 15 to 21, wherein the first data map and the reference image are processed to generate the first features using a machine-learning model trained to generate features based on images and data maps.

Aspect 23. The method of any one of aspects 15 to 22, wherein the guide image is processed to generate the second features using a machine-learning model trained to generate features based on images.

Aspect 24. The method of any one of aspects 15 to 23, wherein the guide image comprises the reference image.

Aspect 25. The method of any one of aspects 15 to 24, wherein the guide image comprises a segmentation map based on the reference image.

Aspect 26. The method of any one of aspects 15 to 25, further comprising at least one of: detecting objects based on the second data map; reconstructing a scene based on the second data map; generating data for an extended-reality (XR) application based on the second data map; controlling a vehicle based on the second data map; providing information to a driver of a vehicle based on the second data map; controlling a robot based on the second data map; or modifying an image based on the second data map.

Aspect 27. A non-transitory computer-readable storage medium having stored thereon instructions that, when executed by at least one processor, cause the at least one processor to perform operations according to any of aspects 15 to 26.

Aspect 28. An apparatus for providing virtual content for display, the apparatus comprising one or more means for perform operations according to any of aspects 15 to 26.

What is claimed is:

1. An apparatus for modifying a map, the apparatus comprising:

one or more memory; and one or more processors coupled to the one or more memory and configured to:

process a first data map and a reference image to generate first features, the first data map including a first number of data values;

process a guide image to generate second features;

modify the first features based on the second features to generate modified features;

modify the first data map based on the modified features to generate a modified first data map; and generate a second data map based on the modified first data map, the second data map including a second number of data values that is greater than the first number of data values.

2. The apparatus of claim 1, wherein, to modify the first features based on the second features, the one or more processors are configured to process the first features and the second features using a machine-learning model trained to modify features.

3. The apparatus of claim 1, wherein, to modify the first features based on the second features, the one or more processors are configured to process the first features and the second features using an image-guided disparity-modulation machine-learning model.

4. The apparatus of claim 1, wherein, to modify the first features based on the second features to generate modified features and to modify the first data map based on the modified features to generate a modified first data map, the one or more processors are configured to inject image features of the second features into the first data map.

5. The apparatus of claim 1, wherein, to generate the second data map, the one or more processors are configured to combine the first data map with the modified first data map based on a confidence map related to the first data map.

6. The apparatus of claim 1, wherein:

the first data map comprises a first depth map, the first number of data values comprises a first number of depth values indicative of depths of a first number of points of a scene, the second data map comprises a second depth map, and the second number of data values comprises a second number of depth values.

7. The apparatus of claim 1, wherein:

the first data map comprises a first disparity map, the first number of data values comprises a first number of disparity values indicative of distances between matching points of paired images of a scene, the second data map comprises a second disparity map, and the second number of data values comprises a second number of disparity values.

8. The apparatus of claim 1, wherein the first data map and the reference image are processed to generate the first features using a machine-learning model trained to generate features based on images and data maps.

9. The apparatus of claim 1, wherein the guide image is processed to generate the second features using a machine-learning model trained to generate features based on images.

10. The apparatus of claim 1, wherein the guide image comprises the reference image.

11. The apparatus of claim 1, wherein the guide image comprises a segmentation map based on the reference image.

12. The apparatus of claim 1, further comprising a camera configured to capture at least one of the reference image or the guide image.

13. The apparatus of claim 1, further comprising a first camera and a second camera positioned a predetermined distance apart, wherein the first camera is configured to capture the reference image and the second camera is configured to capture a paired image and wherein the one or more processors are configured to determine the first data map based on the reference image and the paired image.

14. The apparatus of claim 1, wherein the one or more processors are further configured to at least one of:

detect objects based on the second data map;

reconstruct a scene based on the second data map;

generate data for an extended-reality (XR) application based on the second data map;

control a vehicle based on the second data map;

provide information to a driver of a vehicle based on the second data map;

control a robot based on the second data map; or modify an image based on the second data map.

15. A method for modifying a map, the method comprising:

processing a first data map and a reference image to generate first features, the first data map including a first number of data values;

processing a guide image to generate second features;

modifying the first features based on the second features to generate modified features;

modifying the first data map based on the modified features to generate a modified first data map; and generating a second data map based on the modified first data map, the second data map including a second number of data values that is greater than the first number of data values.

16. The method of claim 15, wherein modifying the first features based on the second features comprises processing the first features and the second features using an image-guided disparity-modulation machine-learning model.

17. The method of claim 15, wherein modifying the first features based on the second features to generate modified features and modifying the first data map based on the modified features to generate a modified first data map comprises injecting image features of the second features into the first data map.

18. The method of claim 15, wherein generating the second data map comprises combining the first data map with the modified first data map based on a confidence map related to the first data map.

19. The method of claim 15, wherein:

the first data map comprises a first depth map, the first number of data values comprises a first number of depth values indicative of depths of a first number of points of a scene, the second data map comprises a second depth map, and the second number of data values comprises a second number of depth values.

20. The method of claim 15, wherein:

the first data map comprises a first disparity map, the first number of data values comprises a first number of disparity values indicative of distances between matching points of paired images of a scene, the second data map comprises a second disparity map, and the second number of data values comprises a second number of disparity values.

* * * * *